(12) United States Patent
Pryor et al.

(10) Patent No.: US 9,247,321 B2
(45) Date of Patent: Jan. 26, 2016

(54) TELEMETRY SYSTEM AND APPARATUS

(75) Inventors: James Matthew Pryor, Melbourne (AU); Anthony Kahl, Melbourne (AU); Stephen Wallace, Melbourne (AU); Gino Garbellini, Melbourne (AU); Simon Holmes A Court, Melbourne (AU)

(73) Assignee: Observant Pty Ltd, Fitzroy (AU)

( * ) Notice: Subject to any disclaimer, the term of this patent is extended or adjusted under 35 U.S.C. 154(b) by 594 days.

(21) Appl. No.: 13/145,340

(22) PCT Filed: Jan. 22, 2010

(86) PCT No.: PCT/AU2010/000067
§ 371 (c)(1),
(2), (4) Date: Jul. 19, 2011

(87) PCT Pub. No.: WO2010/083571
PCT Pub. Date: Jul. 29, 2010

(65) Prior Publication Data
US 2011/0273304 A1 Nov. 10, 2011

Related U.S. Application Data

(60) Provisional application No. 61/146,293, filed on Jan. 21, 2009.

(30) Foreign Application Priority Data

Jan. 22, 2009 (AU) .............................. 2009900216

(51) Int. Cl.
G08C 19/16 (2006.01)
H04Q 9/00 (2006.01)
(Continued)

(52) U.S. Cl.
CPC ............. *H04Q 9/00* (2013.01); *H04Q 2209/40* (2013.01); *H04Q 2209/88* (2013.01); *H04W 4/00* (2013.01); *H04W 8/00* (2013.01)

(58) Field of Classification Search
CPC ............ H04W 4/00; H04W 8/00; G06F 9/54; G06F 17/30371; G06Q 10/00
USPC ....................................... 340/870.01, 539.13
IPC ................................................ H04W 4/00, 8/00
See application file for complete search history.

(56) References Cited

U.S. PATENT DOCUMENTS 6,124,806 A 9/2000 Cunningham et al.
7,423,985 B1* 9/2008 Hill ............................ 370/310.1
(Continued)

FOREIGN PATENT DOCUMENTS

WO WO-2010083571 A1 7/2010

OTHER PUBLICATIONS

"International Application Serial No. PCT/AU2010/000067, International Preliminary Report on patentability mailed Jul. 26, 2011", 6 pgs.
(Continued)

*Primary Examiner* — Shirley Lu
(74) *Attorney, Agent, or Firm* — Schwegman Lundberg & Woessner, P.A.

(57) ABSTRACT

An apparatus for receiving information at a location and communicating at least a subset of said information to a second location comprising an energy module; a communications module; and a data module.

4 Claims, 7 Drawing Sheets

(51) Int. Cl.
*H04W 4/00* (2009.01)
*H04W 8/00* (2009.01)

(56) References Cited

U.S. PATENT DOCUMENTS

2003/0191989 A1* 10/2003 O'Sullivan ................. 714/47
2004/0056771 A1 3/2004 Dungan
2004/0213266 A1* 10/2004 Willhite et al. .......... 370/395.43
2007/0211782 A1 9/2007 Thompson
2008/0137484 A1 6/2008 Scott

OTHER PUBLICATIONS

"International Application Serial No. PCT/AU2010/000067, International Search Report mailed Apr. 7, 2010", 5 pgs.
"International Application Serial No. PCT/AU2010/000067, International Written Opinion mailed Apr. 7, 2010", 5 pgs.

* cited by examiner

TELEMETRY SYSTEM AND APPARATUS

BACKGROUND OF THE INVENTION

A telemetry system is one that provides a means of monitoring information that is then able to be accessed from a point some distance from the measurement site.

The technology and methods used to create such systems in the past have been bespoke combinations of well known (but basic) radio technology and components from the industrial control and monitoring sector. Prior systems have suffered from a number of difficulties, including:

- Requiring regular maintenance or checks which is costly especially if the equipment is in a remote location;
- Relatively high power consumption—components from the industrial sector used in bespoke systems are rarely considered to be low-power;
- No central quality assurance system in place for the unit as a whole;
- Complex to install which, especially in remote locations requires a great deal of logistical effort;
- Require large amounts of in-field wiring, housings and mountings, adding to maintenance costs;
- Lack of or low upgradeability;
- Lack of interoperability with other systems, components and software;
- Require the use of relatively expensive control and measurement products, but also require a large degree of per-site engineering and customisation;

The reference to any prior art in this specification is not, and should not be taken as, an acknowledgement or any form of suggestion that the prior art forms part of the common general knowledge.

SUMMARY OF THE INVENTION

According to one aspect of the invention, there is provided an apparatus for receiving information at a location and communicating at least a subset of said information to a second location comprising an energy module; a communications module; and a data module. According to another aspect of the invention, there is provided an apparatus according to the invention configured to work in conjunction with at least one other such apparatus.

According to another aspect of the invention, there is provided a method for constructing an apparatus according to the invention comprising ensuring close integration of component parts.

According to another aspect of the invention, there is provided a method for optimising one or more operational parameters of a telemetry apparatus comprising adjusting operation of one or more aspects of the telemetry system in accordance with a predetermined operational guideline wherein the predetermined operational guideline is optionally at least partially determined by the telemetry apparatus or optionally otherwise.

According to another aspect of the invention, there is provided a method for monitoring the operation of a telemetry apparatus comprising operating a monitoring module wherein optionally the telemetry apparatus comprises the monitoring module or it is optionally co-located with said telemetry apparatus.

According to another aspect of the invention, there is provided a communication method for a telemetry device comprising optionally switching between a plurality of communication methods depending on one or more rules which optionally relate to one or more of communication speed, bandwidth, cost, network routing configuration, speed of access to another location or any other suitable communication parameter.

According to another aspect of the invention, there is provided a communication method for a telemetry apparatus comprising network discovery by the telemetry apparatus.

According to another aspect of the invention, there is provided a communication method for a telemetry apparatus comprising adjustment of one or more network or apparatus parameters depending on one or more characteristics of each network member.

According to another aspect of the invention, there is provided a method of aggregating data comprising collecting data from at least one apparatus according to the invention.

A method of utilising data originating from an apparatus according to the invention comprising making the data available in a commonly used data format.

Other aspects of the invention comprise-one or more storage devices comprising machine readable code for operation of any one or methods of the invention.

According to one aspect of the invention, there is provided a telemetry apparatus comprising an energy module, a communications module and a data module wherein the long term cost of operation is reduced. The long term cost of operation may be reduced at least partially by one or more aspects of the energy module. Any suitable type of energy module may be used in, an apparatus according to the invention. In some embodiments the energy module optionally comprises one or more of an energy storage device and an energy generating device and the energy storage device optionally may comprise one or more energy storing systems, such as a battery and the energy generating device may optionally generate and or store energy from one or more of solar, wind, water or fossil fuels.

The output from the energy module may be supplied based on one or more predetermined parameters and these parameters optionally comprise: prevailing solar, wind, water or other energy conditions; the time of day, week, month or year; the historical energy usage of at least one component of the apparatus; a predicted energy requirement of at least one component of the apparatus.

Energy efficiency may also be obtained by other means, such as by integrating the components closely so as to reduce wastage. The components themselves may also be selected on the basis that they draw minimal if any current when not operating and have efficient energy ratings when operating.

Any other known technique to reduce energy consumption may also be deployed in the invention.

According to another aspect of the invention, the long term cost of operation may be reduced at least partially by one or more aspects of the communications module. Any suitable communications module may be used in the invention. In some embodiments, it comprises a wireless and/or radio technology which may optionally comprise UHF, Short Wave Radio, Mobile telephone network, satellite communications, or any other suitable communications technology.

A particular feature of some embodiments is the use of multi channel communication to optimise communication effectiveness and/or efficiency. In some embodiments, the system may break information to be transmitted into subparts to be separately transmitted. These subparts may be communicated concurrently and multiple copies of a subpart may be transmitted to a plurality of places concurrently. In some embodiments each subpart is indexed so as to be able to be reordered after arrival at the destination.

In some embodiments, information is processed, formatted and encoded before being communicated. In some other embodiments, in addition to the recorded information, additional information is combined with the recorded information before being communicated. Such additional information may be the result of a calculation, a logical operation, a fact or any other information. In yet further embodiments, for the purposes of conserving processing power, information is communicated without any processing, formatting, encoding, which are later performed by a unit with sufficient power or performed centrally.

In some embodiments involving multiple telemetry units, certain information may be shared and/or stored on a plurality of such units, for example, in a network.

In some embodiments, the system may alter the form of communication depending on one or mare parameters. Thus, for example, if the only available radio connection is of low bandwidth, then an alternative, more suitable communication method may be selected.

In some embodiments, the required communications capacity is minimised in order to reduce overall long term cost of operation. This is achieved through lower communications costs (eg. paid to communications network providers) and lower energy costs, etc.

In some embodiments, the architecture is designed to readily accommodate the various impediments to the communication and aggregation of data. Thus, data may for example be communicated in such a way as to be readily presentable on a web interface which therefore makes it much easier to pass through communications infrastructure. It may also be communicated in other ways which avoid firewalls.

A further feature of some embodiments is the use of different network topologies in order to propagate messages within the network. Such topologies include broadcast, mesh and point-to-point communications. Network topologies can be altered dynamically depending on various criteria, including the availability and quality of communication channels between various different nodes on the network and the power requirements of each unit.

In one aspect of the invention, the long term cost of operation may be reduced at least partially by one or more aspects of the data module. Any suitable form of data module may be used and the data module may comprise any suitable components. In some embodiments, it comprises a data processor and in some embodiments it comprises a data storage module.

The data module may be adapted to monitor and optionally store and/or analyse information in fine detail. This may be brought about by integration with a sensing device which is capable of sensing finer information and/or by setting finer predetermined input parameters.

In some embodiments the balance between performance, energy use, data creation and cost of running the apparatus are monitored and adjusted. Such adjustments are preferably done on a continuous basis.

In some embodiments a System Plan is provided to describe desired operational characteristics of the system and the elements of the system are adjusted in a "best efforts" way to attempt to achieve the operational characteristics defined in the System Plan taking into account defined limitations, such as cost objectives, communication limitations, desired power consumption constraints and minimum operational requirements. In further embodiments, the system operates according to the System Plan without regard to defined limitations.

In some further embodiments, the System Plan is a machine readable definition created by the end user using any number of abstract creation tools, including in text editors, graphical form or by graphical input elements (such as sliders) via a computer system. In further embodiments, the System Plan is created by the system itself using defined business rules, which may take into account external factors, such are environmental conditions, operational cost and power consumption. The System Plan is then communicated and/or stored (either in whole or by sending relevant elements only) to each unit in the system. The System Plan may be adjusted in real time or near real time.

In another aspect of the invention the long term cost of operation may be reduced at least partially by close integration of a plurality of components. Such integration may be performed by selecting and optimising the components for better interoperability and by setting and requiring-predetermined performance from each component and/or combinations thereof. In some embodiments of this aspect, greater reliability is obtained through such performance standards and associated control over quality that is enabled.

In one aspect of the invention, the long term cost of operation may be reduced at least partially by a self-monitoring module. The self monitoring module may be of any suitable type and comprise any suitable components. By monitoring the operation of the system itself, the quality of information received from external sensors can be more accurately assessed and the maintenance costs can be dramatically reduced as there is less need to travel to each unit to check it. Furthermore, any faults are speedily and accurately identified so that appropriate maintenance resources can be directed in a timely manner.

In preferred embodiments of the system according to the invention, the same approach to gathering and monitoring data in fine detail is used across all monitored parameters, whether they are in respect of monitoring the components and function of the system and platform itself, or whether they are sensors of the external environment, such as a water level sensor.

In another aspect of the invention, the long term cost of operation may be reduced at least partially by minimising maintenance. Maintenance may be reduced by careful attention to any one of the factors described elsewhere in this document. In addition, factors such as the physical design of the unit (eg. with robust materials, using appropriate weather shields and with easily 'hot swappable' components) and the close monitoring of its components will reduce the maintenance requirements of the system.

Another aspect of the invention provides that the long term cost of operation may be reduced at least partially by a data quality module to monitor the quality of information received. This enables the user to make informed choices about the health of the apparatus and also allows optimisation of the operation of the system.

In another aspect of the invention, there is provided a plurality of units according to the invention which are optionally networked for greater efficiency, for example in relation to data, communication, cost, or energy.

According to one further aspect of the invention, there is provided a telemetry apparatus as described above, which communicates with a server. An end user then accesses information communicated to the server in any number of visual representations.

According to another aspect of the invention, there is provided an apparatus for receiving information at a location and communicating at least a subset of said information to a second location comprising an energy module; a communications module; and a data module. The apparatus may be adapted so that the long term cost of operation is at least partially reduced.

The apparatus may be such that the energy module comprises one or more of an energy storage module, an energy generating device which optionally generate energy from one or more of solar, wind, water; fossil fuel or batteries. The apparatus may be such that the apparatus may select between a plurality of energy generating devices dynamically.

The apparatus may be such that the communications module supports one or more of wired and wireless communications methods and optionally multiple wireless communication methods, optionally concurrently. The apparatus may be such that the apparatus communicates using different communication methods dynamically.

The apparatus may be such that information is processed before being communicated optionally by any one or more of:
  adding information;
  removing information;
  compressing information;
  adding information based on a calculation;
  adding time and date information;
  adding location information;
  processing information according to an algorithm; and
  pre-formatting information in a standard format.

The apparatus may be such that information is communicated to another apparatus for the purposes of processing information before being communicated to the second location.

The apparatus may be such that where the communications module may communicate with other apparatus in a network in order to propagate information to a second location. The apparatus may be such that where the network topology is created dynamically in order to achieve desirable operational outcomes. The apparatus may be such that where the network topology is created dynamically in order to achieve reliable propagation of information to the second location.

The apparatus may be such that where the data module collects information. The apparatus may be such that information is collected from one or more sensors. The apparatus may be such that the data module stores information collected.

The apparatus may be such that the operational characteristics of one or more elements of the apparatus is defined according to desired operational characteristics "System Plan"). The apparatus may be such that one or all of the desired operational characteristics in the System Plan is defined by a user of the apparatus. The apparatus may be such that one or all of the desired operational characteristics in the System Plan is calculated according to other desired operational characteristics. The apparatus may be such that one or all of the desired operational characteristics in the System Plan is calculated according to commercial objectives. The apparatus may be such that one or all of the desired operational characteristics in the System Plan is defined according to hardware or software characteristics.

The apparatus may be such that the operational characteristics of each relevant element of the apparatus is modified so as to best balance the desired operational characteristics described in the System Plan. The apparatus may be such that the System Plan is created by a user of the apparatus using an abstract tool, optionally including one or more of:
  Text editing
  Graphical elements
  Interactive methods of changing desired operational characteristics
  Selection of pre-existing desired operational characteristics The apparatus may be such that where components are selected and tightly integrated with a view to reducing the capital and/or operational cost of the apparatus. The apparatus may be such that where the apparatus is constructed of materials selected to reduce the maintenance requirement.

The apparatus may be such that where the apparatus is constructed in such a way that elements of the apparatus are "hot swappable". The apparatus may be such that it incorporates a self-monitoring module to monitor the operation of the apparatus and provide to the data module information relevant to maintenance of the apparatus.

In another embodiment, there is provided a system of apparatuses according to the invention. The system may be such that any number of apparatus may individually or together communicate information to second location. The system may be such that the second location is one or more computer servers. The system may be such that the computer server makes accessible the information stored to a user of the system. The system may be such that the operational characteristics at the sever is defined according to desired operational characteristics described in the System Plan.

The system may be such that one or all of the desired operational characteristics in the System Plan is defined by a user of the system. The system may be such that one or all of the desired operational characteristics in the System Plan is calculated according to other desired operational characteristics. The system may be such that one or all of the desired operational characteristics in the System Plan is calculated according to commercial objectives. The system may be such that one or all of the desired operational characteristics in the System Plan is defined according to hardware or software characteristics. The system may be such that the operational characteristics of each relevant element of the server is modified so as to best balance the desired operational characteristics described in the System Plan.

The system may be such that the System Plan is created by a user of the system described herein using an abstract tool, optionally including one or more of:
  Text editing
  Graphical elements
  Interactive methods of changing desired operational characteristics
  Selection of pre-existing desired operational characteristics The system may be such that where a user of the system may retrieve information stored on a server upon request, such request optionally being made by a device or software module on an automated basis.

The system of the current invention addresses a number of the problems with prior art systems, for example in some embodiments it does this by one or more of:
  Reducing the need for regular maintenance or checks which are costly especially if the equipment is in a remote location;
  Lowering power consumption;
  Unifying manufacture of each unit which for example allows a central quality assurance system for the unit as a whole;
  Simplifying installation and therefore reducing logistical effort;
  Requiring minimal in-field wiring, housings and mountings, and therefore reducing maintenance costs;
  Increasing upgradeability which is partly due to a unified design;
  Increasing interoperability with other systems, components and software, including by reason of standards compliance;
  Requiring the use of relatively inexpensive control and measurement products;
  Requiring a lower degree of per-site engineering and customisation;

Providing a more defined system management model allowing management of the system at different levels of abstraction (that is, on a per module basis, by logical and/or physical groups or overall); and Increasing sensitivity to different unique requirements, such as geographical requirements or customer service requirements, which may change during the operational life of the unit.

Throughout this specification (including any claims which follow), unless the context requires otherwise, the word 'comprise', and variations such as 'comprises' and 'comprising', will be understood to imply the inclusion of a stated integer or step or group of integers or steps but not the exclusion of any other integer or step or group of integers or steps.

DETAILED DESCRIPTION OF EXEMPLARY EMBODIMENTS

Figure 1:
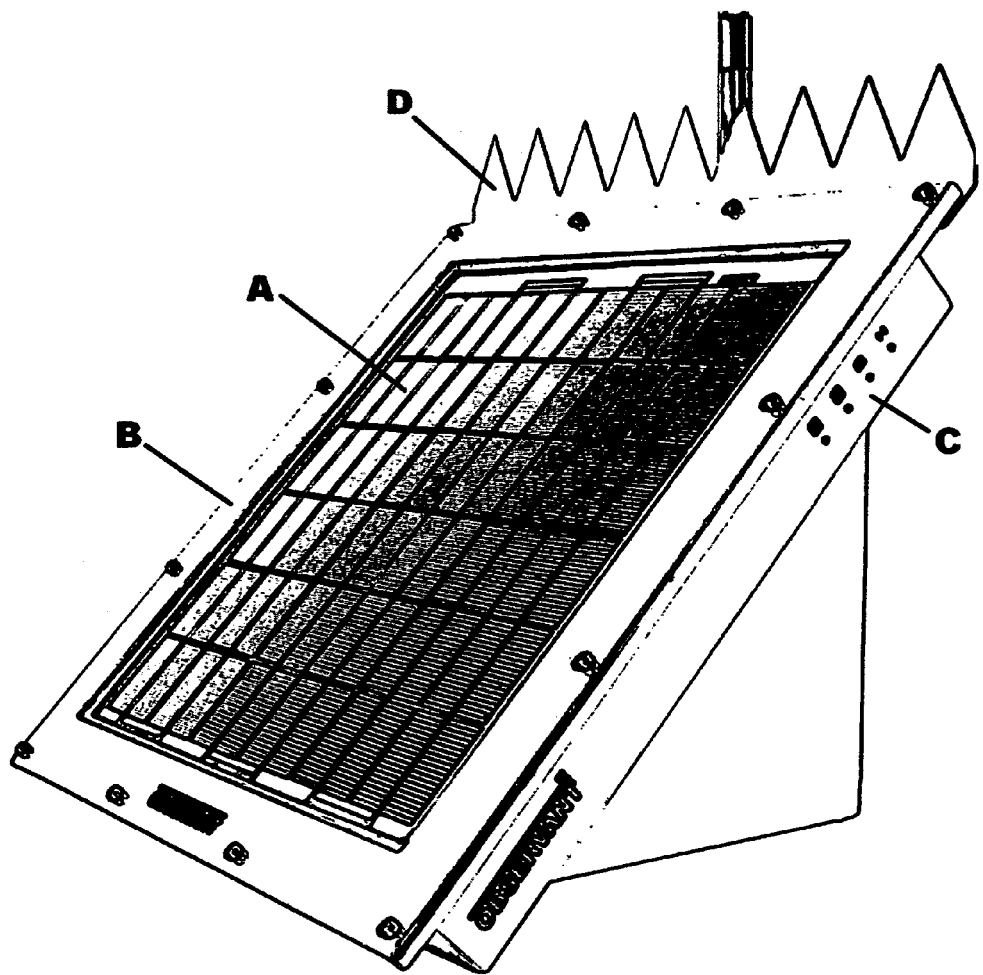
FIG. 1 is a front isometric view of one embodiment of the invention

It is convenient to describe the invention herein in relation to particularly preferred embodiments. However, the invention is applicable to a wide range of applications and it is to be appreciated that other constructions and arrangements are also considered as falling within the scope of the invention. Various modifications, alterations, variations and or additions to the construction and arrangements described herein are also considered as falling within the ambit and scope of the present invention.

1. The Telemetry Apparatus

According to one aspect of the invention, there is provided a telemetry apparatus comprising an energy module, a communications module and a data module.

The energy module is used to power the device and may comprises one or more of any suitable energy generating devices (such has solar panels, wind turbines, stored energy systems, etc) and optionally an energy storage system.

The data module comprises one or more of any suitable devices to capture information regarding the environment. Optionally the data module can also capture information about the machine itself. Further, optionally the data module is capable of undertaking processing of that information.

The communications module comprises one or more suitable communication devices which enables the apparatus to communicate information collected by the data nodule to a second location.

The function and inter-operation of the various modules is described in more detail below.

2. The System Plan

Some embodiments comprise a System Plan. The System Plan is a description of the desirable characteristics of the system and apparatus at all levels of operation—from hardware to software and performance, including what the user expects to see, the level of detail required and the historical and archival requirements for long-term data retention. The System Plan also represents a formal, and machine-readable definition of the service level agreement between the system operator and the data consumer.

The System Plan is stored in machine readable format. At a minimum, the System Plan contains:

A description of the desirable characteristic

A scope of desirable values

One or more weightings of priority.

System Plan weightings are used to determine which requirements take priority over others in the case of conflict. Where the conflict cannot be resolved (for example, where two equally important characteristics conflict), further non conflicting weightings may be applied (for example, as a general rule it may be that all conflicts are resolved in favour of reducing price, or maintaining accuracy).

A System Plan can be described in any number of machine readable formats. A very simple example System Plan can be described as:

```
<SystemPlan>
    <Characteristic>
        <Description>Cost</Description>
        <Scope>
            <Low>100</Low>
            <High>500</High>
        </Scope>
        <Priority>5</Priority>
    </Characteristic>
    <Characteristic>
        <Description>Sensitivity</Description>
        <Scope>
            <Low>6</Low>
            <High>9</High>
        </Scope>
        <Priority>3</Priority>
    </Characteristic>
</SystemPlan>
```

The above System Plan describes an apparatus which costs between $100 and $500 and has a sensitivity of between 6 and 9. The cost of the apparatus in the above System Plan is more important than the sensitivity being within particular ranges.

More detailed System Plan information records the impact of characteristics on other characteristics. This allows dynamic real-time adjustment of the system (including each module of the apparatus) in order to achieve (or come as close as possible to achieving or to balance) desired characteristics described in the System Plan. For example:

```
<SystemPlan>
    <Characteristic>
        <Description>Sensitivity</Description>
        <Scope>
            <Low>6</Low>
            <High>9</High>
        </Scope>
        <Priority>3</Priority>
        <Impact>
            <Scope>6</Scope>
            <Power>1000</Power>
```

```
        </Impact>
        <Impact>
            <Scope>7</Scope>
            <Power>3000</Power>
        </Impact>
        <Impact>
            <Scope>8</Scope>
            <Power>5000</Power>
        </Impact>
        <Impact>
            <Scope>9</Scope>
            <Power>8000</Power>
        </Impact>
    </Characteristic>
    <Characteristic>
        <Description>Power</Description>
        <Scope>
            <Low>1000</Low>
            <High>7000</High>
        </Scope>
        <Priority>10</Priority>
        <Impact>
            <Scope>1000</Scope>
            < Sensitivity >6</ Sensitivity>
        </Impact>
        <Impact>
            <Scope>3000</Scope>
            < Sensitivity >7</ Sensitivity>
        </Impact>
        <Impact>
            <Scope>5000</Scope>
            < Sensitivity >8</ Sensitivity>
        </Impact>
        <Impact>
            <Scope>7000</Scope>
            < Sensitivity >8.5</ Sensitivity>
        </Impact>
    </Characteristic>
</SystemPlan>
```

The above System Plan describes an apparatus with a sensitivity between 6 and a power requirement between 1000 and 7000. In this particular example, the power characteristic takes priority over the sensitivity.

In the above System Plan, the impact of changes to the apparatus sensitivity (a Component of the data module) is described in terms of the changes in power requirements (a component of the energy module). As the sensitivity increases, so do the power requirements. At the highest desirable range in sensitivity, the highest desirable power range has been exceeded (sensitivity of 9, power of 8000). Power requirements having priority over sensitivity, the sensitivity of this example device would be practically limited to between 6 and 8.5 in order to achieve the desirable power range.

The following is a further example System Plan which demonstrates an example of how one might specify historical storage requirements and a different mechanism for describing the relationship between measurement sensitivity and power consumed and device storage needed (i.e. higher sensitivity will use more power and take up more storage on the device).

```
<?xml version="1.0" encoding="UTF-8"?>
<systemPlan name="Customer A System Plan">
<visualisedData>
<vizReferences>
    <vizReference name="Temperature" vizId="50.358.temp" site="Tree Enclosure">
      <fieldReferences>
        <fieldRefence fieldId="value" name="Temp" fieldLabel="ld" history="1w.1h,1m.4h,3m.1d" />
      </fieldReferences>
    </vizReference>
</vizReferences>
</visualisedData>
<systemConstraints>
    <!-- show the correlation between measurement sensitivity and power consumption and device storage needs -->
    <characteristic name="Power Consumption" priority="5">
      <valueRange upperBound="1400 mW" lowerBound="400 mW" />
    </characteristic>
    <characteristic name="Device Storage" priority="4">
      <valueRange upperBound="500 kb" lowerBound="0 kb" />
    </characteristic>
    <characteristic name="Sensitivity" priority="3">
      <valueRange upperBound="4" lowerBound="9" />
      <operatingProfile name="High Sensitivity">
        <!-- high sensity will use more power and more storage -->
        <valueRange upperBound="9" lowerBound="7" />
        <impact charcteristic="Power Consumption">
          <valueRange upperBound="1400 mW" lowerBound="1000 mW" />
        </impact>
        <impact charcteristic="Device Storage">
          <valueRange upperBound="500 kb" lowerBound="400 kb" />
        </impact>
      </operatingProfile>
      <operatingProfile name="Low Sensitivity">
        <!-- low sensity will use less power and more storage -->
        <valueRange upperBound="3" lowerBound="4" />
        <impact charcteristic="Power Consumption">
          <valueRange upperBound="450 mW" lowerBound="400 mW" />
        </impact>
        <impact charcteristic="Device Storage">
          <valueRange upperBound="100 kb" lowerBound="50 kb" />
        </impact>
      </operatingProfile>
    </characteristic>
</systemConstraints>
</systemPlan>
```

Characteristics described in a System Plan may come from a number of different sources, for example:

a. Intrinsic Characteristics

Intrinsic characteristics in the System Plan are those characteristics which cannot be modified. These may be physical constraints (such as size or weight of the apparatus or the wavelength of light), logical constraints (such as the type of computational processing available to the apparatus), operational constraints (such as the maximum throughput rate of communications) and commercial constraints (such as a minimum cost of components).

Typically intrinsic characteristics will have the highest weighting.

b. Supplier Characteristics

Supplier characteristics are those characteristics defined by the suppler of the apparatus (or the person responsible for managing the apparatus). Examples may be the supplier defined minimum oust of particular components or the supplier defined operational characteristics of the components produced by that particular supplier as opposed to any other supplier).

Typically supplier characteristics are unique to a particular supplier or installation and while a different supplier or installation may be able to offer different characteristics, this particular supplier or installation dues not.

Typically supplier characteristics will have a high weighting.

c. Commercial Characteristics

Commercial characteristics are similar to Supplier characteristics except that they are open to modification within a particular supplier and installation.

As an example, hardware characteristics of a particular apparatus may support very low cost operation by controlling variables like power consumption, network and communications levels, diagnostic and data capture and storage. Tu support such a low cost system, the business must carefully manage operating costs. Of the things that impact operating costs, some are fixed and some scale with the number and type of systems deployed. Operational aspects such as online data storage, network bandwidth consumption, data archival & retention requirements, and servicing user requests all have direct and material impact on operating costs. Such factors can be defined in the System Plan.

d. User Characteristics

User characteristics describe the characteristics desirable to the end user, within particular constraints.

Typically User characteristics focus on the high scope range of some characteristics (such as duration of data retention) and the low scope range or other characteristics (such as cost)

The System. Plan can be used to describe the minimum service levels to be achieved by the system and apparatus. For this purpose, typical focus will be on achieving the low scope range of defined user characteristics (for example, sensitivity) while staying within the desirable scope of intrinsic, supplier and commercial characteristics.

One of the key advantages of the invention is the ability to use the System Plan as the basis for configuring the operation of the system to achieve a particular operational goal (such as low cost) taking into account pre-defined characteristics (such as maintaining reliability). Further, such configuration can be undertaken by a user without a detailed knowledge of the factors which impact performance or attributes which need to be adjusted to achieve the goal using an abstracted tool, such as a graphical user interface. This approach allows a user to specify the desired operational requirements of a system and subsequently allow that system to dynamically adjust its configuration to meet those requirements conforming to predefined goals, such as achieving the lowest, reliable operating cost.

This System Plan further provides a basis for automated and on-going optimisation of the end-to-end operation of the system to ensure the ideal balance between relevant factors, such as operating cost and service level agreement compliance.

Network topology, routing rules and network technology can all be selected based on information from the System Plan. Further examples of System Plan definitions include:

Selecting free-to-air network technologies where possible, or partially used to minimise costs.

Defining data retention and timeliness characteristics to enable speed and bandwidth optimizations to further reduce operating cost.

Selecting network routing configurations (including dynamically selecting between different communication technologies and configurations) to lower performing, lower cost alternatives, or different routing rules for cost reduction and/or performance improvements.

System Plan attributes will also allow the automatic configuration of in-field equipment settings to optimise desirable performance characteristics, such as optimising system performance whilst minimising power consumption. Very low power operation has a significant impact on field equipment operating cost.

Reduction in device level storage and minimal use of device communications strongly impact power consumption and further improve system performance.

System Plan elements are also used to configure operating characteristics of apparatus deployed in remote geographic locations. Such operating characteristics include the level of diagnostics desirable and level of data capture & retention characteristics in each element of the system.

Further, System Plan elements can be used to determine equipment with lowest capital cost that would achieve the desired operational characteristics.

Figure 8:
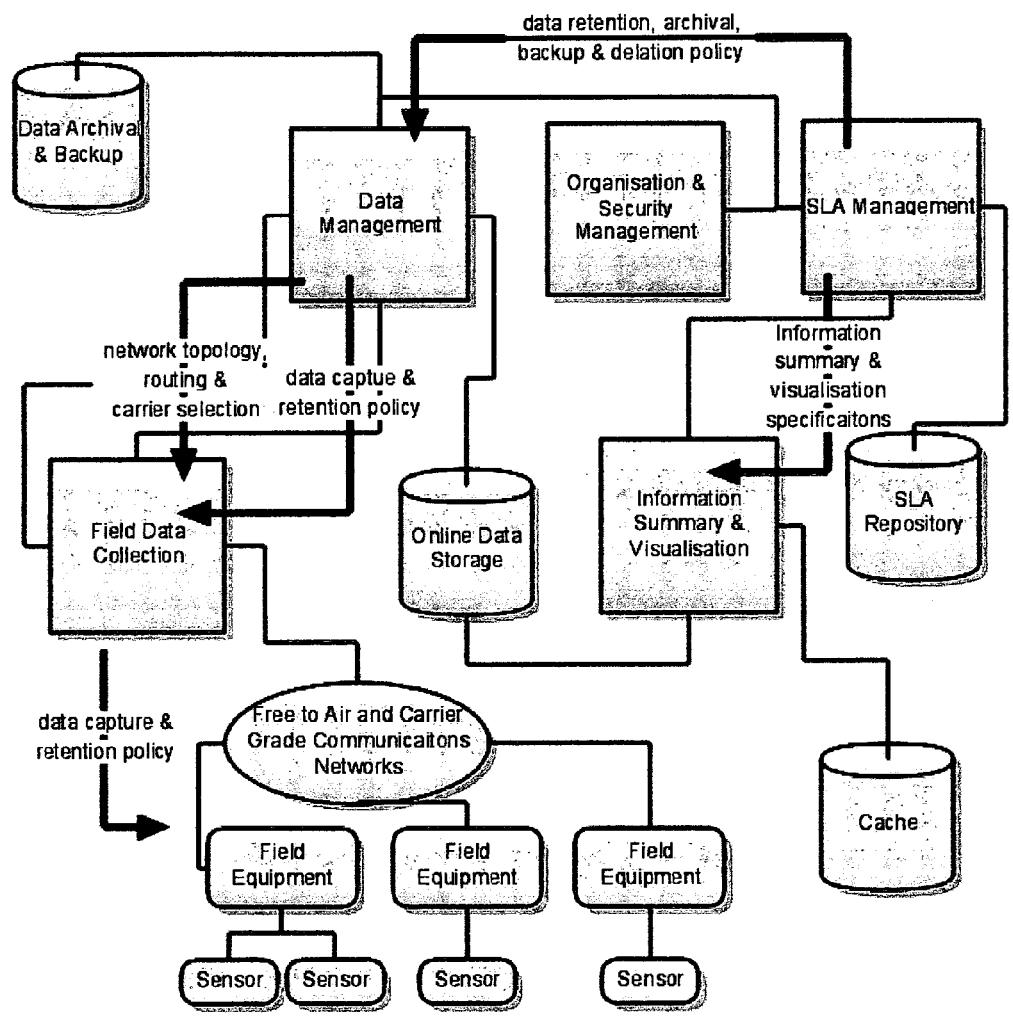
FIG. 8 is a diagram showing one preferred embodiment of the interrelationship and information flow between system elements (such as the sensors) and business requirements (such as service level requirements)

FIG. 8 shows the interrelationship of the elements of a system together with an example System Plan via an SLA Management module.

3. Construction of an Example Telemetry Apparatus

As noted above, one of the key issues with current systems is the bespoke nature of their construction using standard off-the-shelf components. While maintaining the flexibility of such systems (though a modular design, rigorous characteristic mappings using the System Plan and the use of open standards and interfaces), the current invention contemplates a tightly integrated system and apparatus.

By providing a single, integrated system, the invention for the first time enables a rigorous quality assurance program to be built around production, maintenance and use of such a system. In particular, the close integration and optimisation of the components in the invention means that interoperability standards can be developed which further enhances control over quality. The close integration is brought about by various means, for example by including purpose built electronics and an enclosure designed specifically for the particular electronics used. In addition, the system of the invention is built up from a much lower lever than existing systems—from an electronic component lever, rather than an off-the-shelf level.

FIG. 1 depicts a front isometric view of one embodiment of the invention. Full integration of the solar panel (FIG. 1, A), into the product metalwork means that no additional bracketing is required to mount the panel. Furthermore protection of the power cable exiting the solar panel is inherent in such configurations. Integration of the solar panel into the product is achieved by a tray (C) and retaining frame (B) configuration. This embodiment further comprises a detachable bird deterrent (D).

Figure 2:
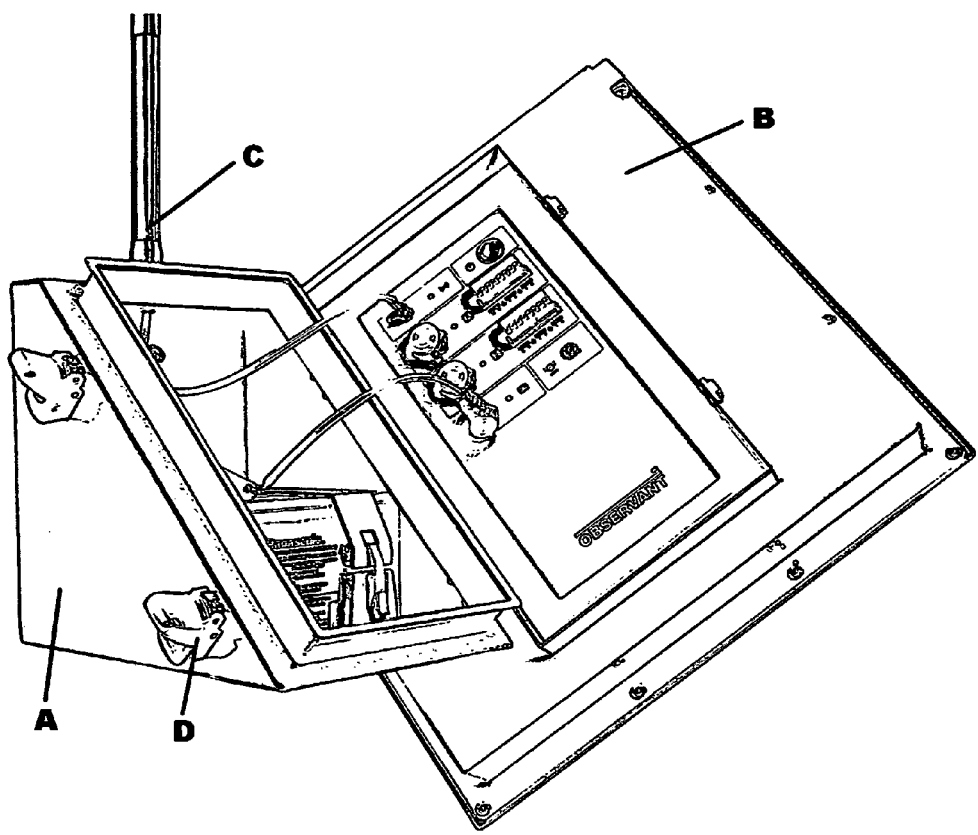
FIG. 2 is a front isometric view of the embodiment of FIG. 1, with the door open

FIG. 2 is a front isometric view of the embodiment of FIG. 1, with the dour open some embodiments, a unit according to the present invention is comprised of two major components, a primary and secondary enclosure. It is within the scope of the invention to have any suitable number of enclosures in a unit according to the invention. The primary and secondary enclosures may be configured in any suitable way and house any suitable components. In some embodiments, the secondary enclosure houses the electronics, radio and solar power supply for the system. In some embodiments, the primary enclosure is contained within the door to the secondary enclosure and is therefore the first enclosure encountered by a user.

FIG. 2 depicts a unit according to the invention with an outer case (A) in which (B) comprises the primary enclosure as well as the door to the secondary enclosure and houses, on its outer surface, the solar panel. Door (B) (which is also the primary enclosure) may be maintained in the closed position by latches (D). An antenna (C) is also depicted.

The entirety of the electronics may be housed within the primary enclosure underneath the solar panel face. Connectors and terminal blocks on the rear of the enclosure allow for connection of external devices. Along with a clear graphical representation of the functionality of the connections. The primary enclosure may also act as the door to the primary enclosure housing the battery and installation wiring.

Figure 3:
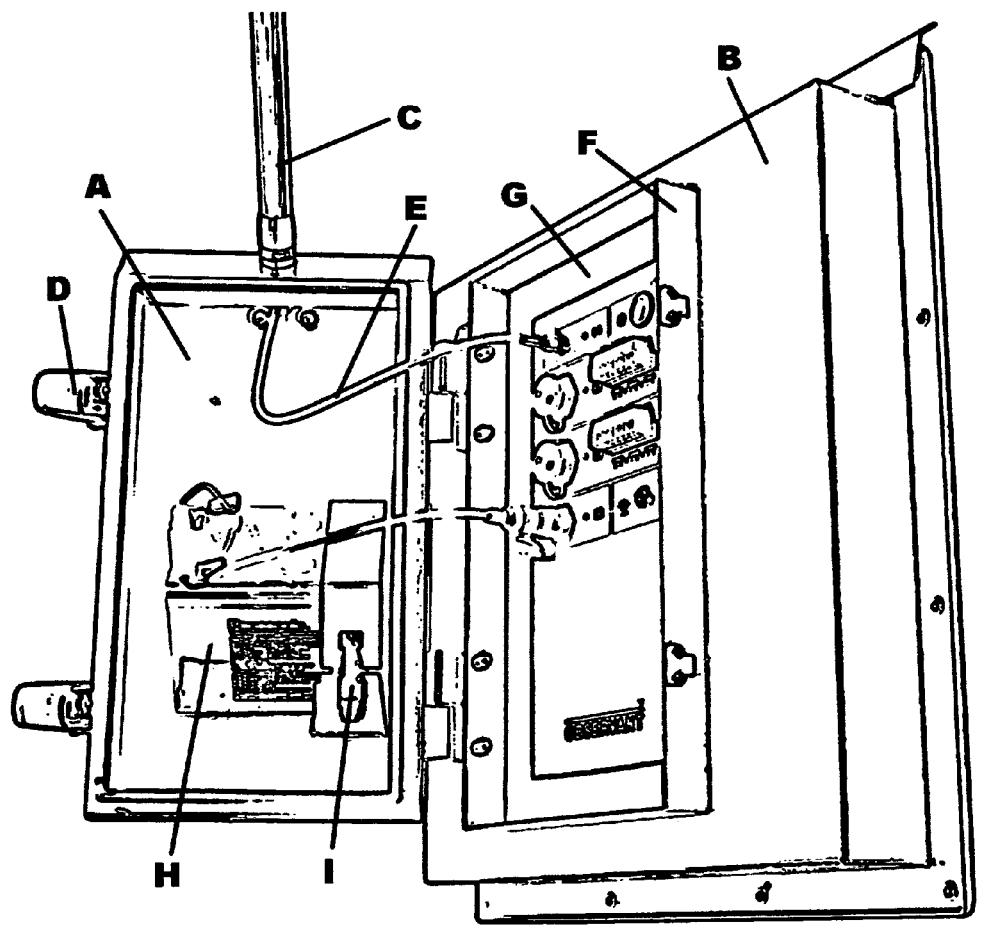
FIG. 3 is a front view of the embodiment of FIG. 1, with the door open

FIG. 3 is a front view of another embodiment of the invention with the door open. Secondary enclosure (A) houses battery (H) held in place by brace (I) and electrical lead (E) passes through enclosure (A) to the electronics (G) on the inner side of door (B). Outer door (B) which also comprises the primary enclosure, comprises insulating material so as to protect the electronics and contents of the unit and is held in place by latches (D).

Figure 4:
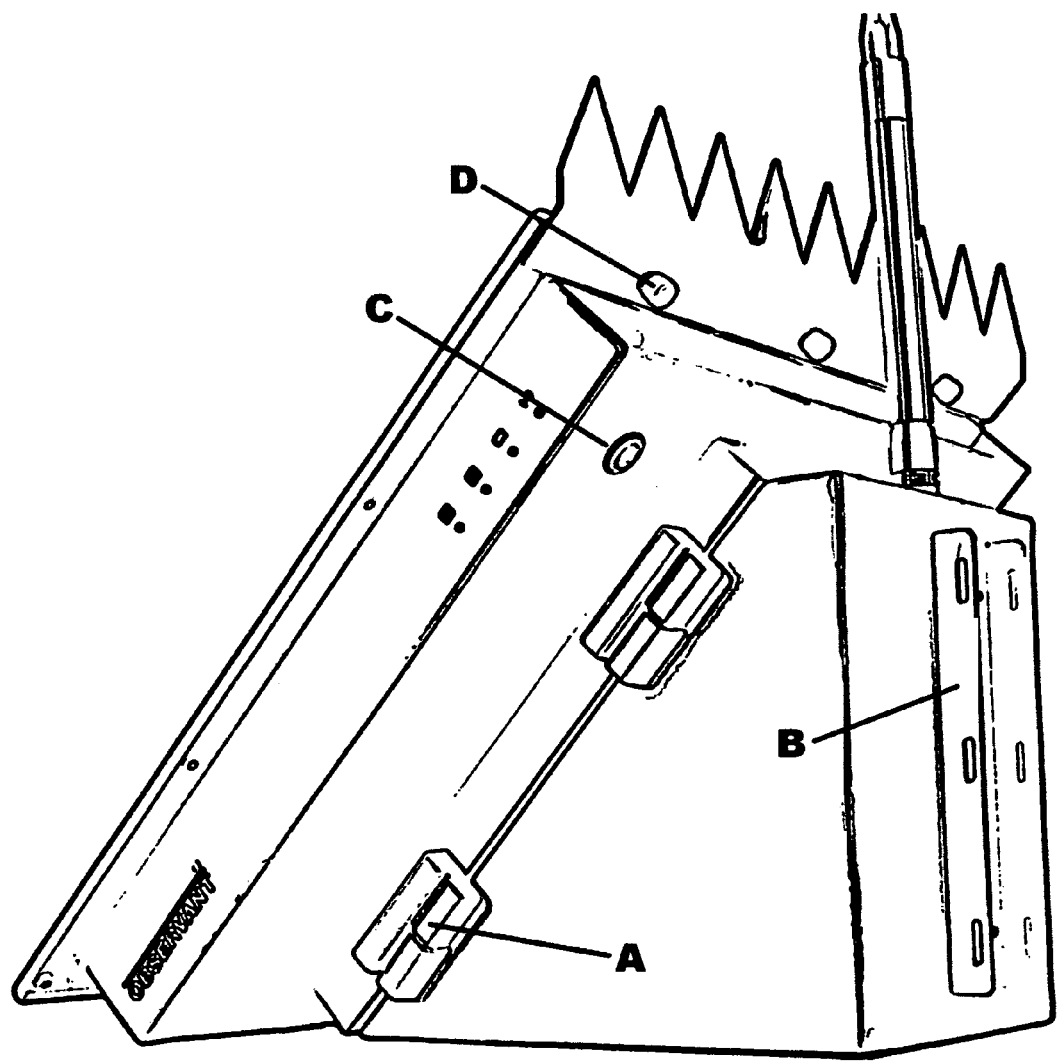
FIG. 4 is a rear view of the outer or primary enclosure according to certain embodiments

FIG. 4 is a rear view of a unit according to certain embodiments. The outer door, which houses the solar panel and the primary enclosure swings between opened and closed positions on hinges (A) and comprises. Bracket (B) is used to mount the unit at a suitable location in the field and (C) is a user push button.

Figure 5:
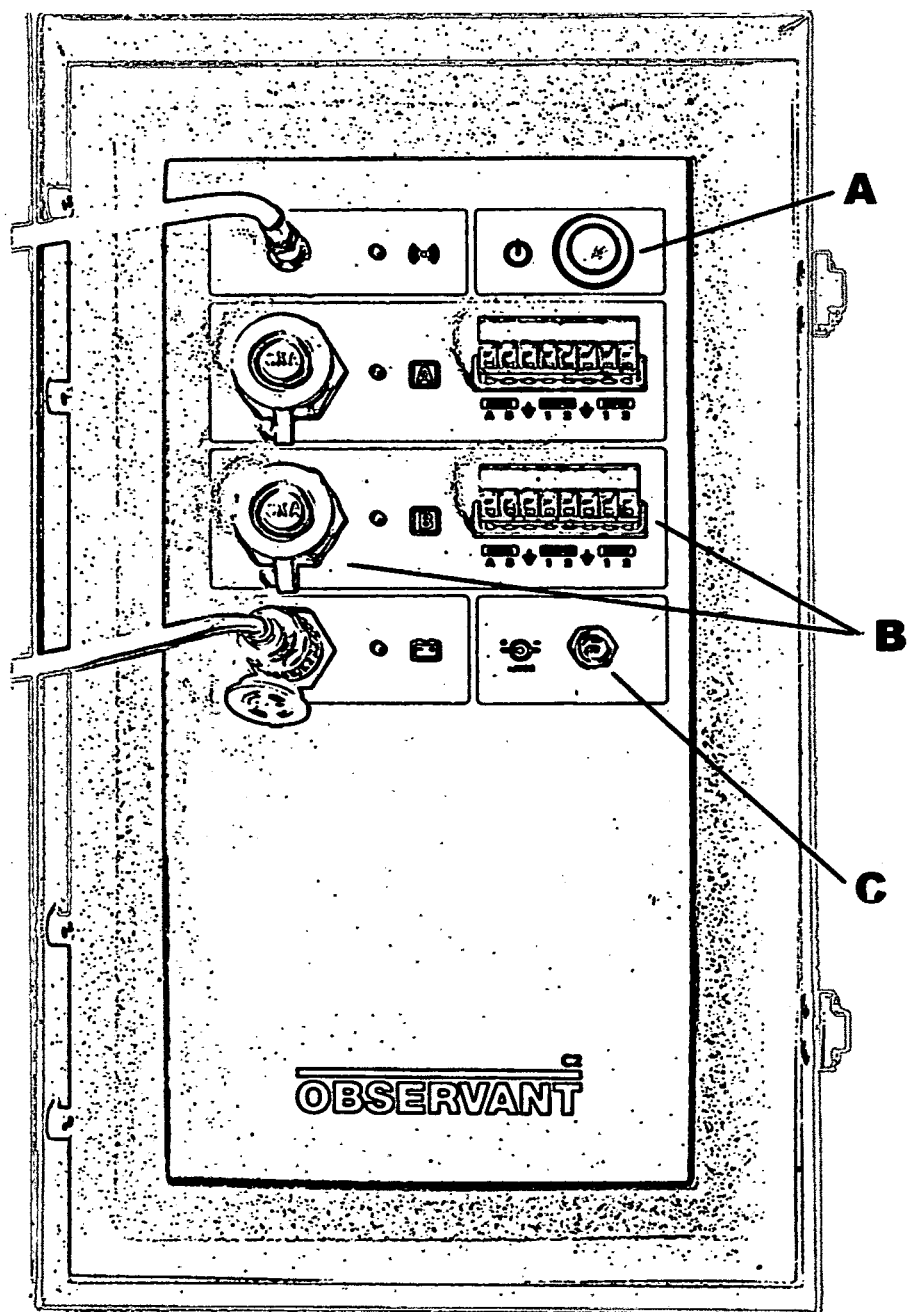
FIG. 5 is a depiction of the internal electronics according to some embodiments

FIG. 5 is a depiction of the internal electronics according to some embodiments. In these embodiments, the electronics are housed on the inner side of the door to the inner (or secondary) enclosure. FIG. 5 depicts User Input Button (A), Port Connectors (B) and DC plugback (C).

Figure 6:
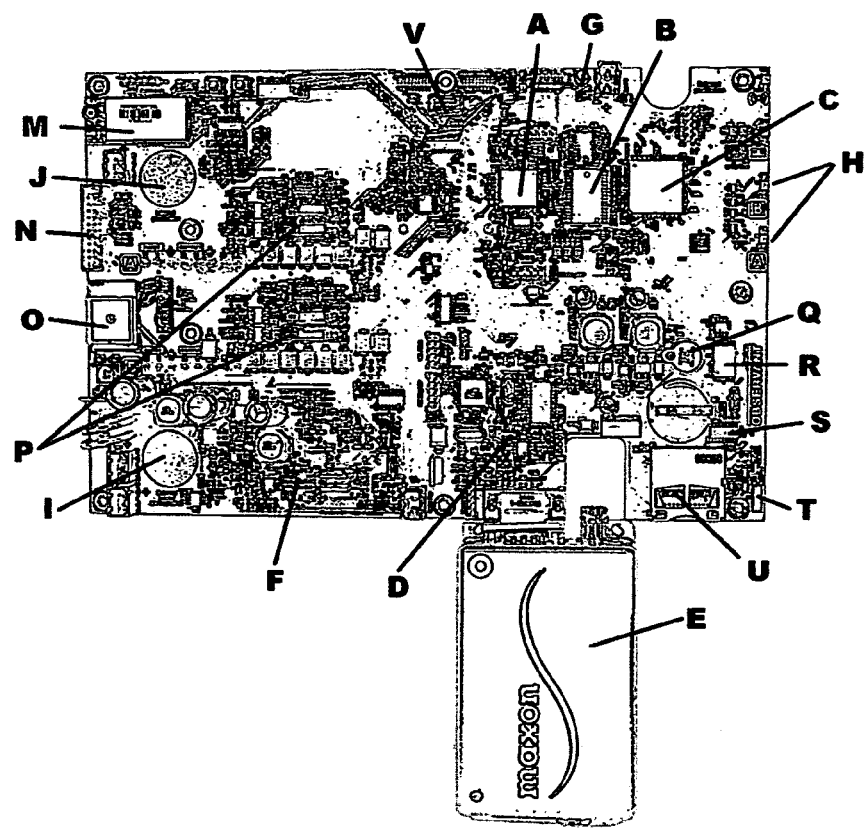
FIG. 6 is a diagram depicting the internal electronics according to some embodiments
Figure 7:
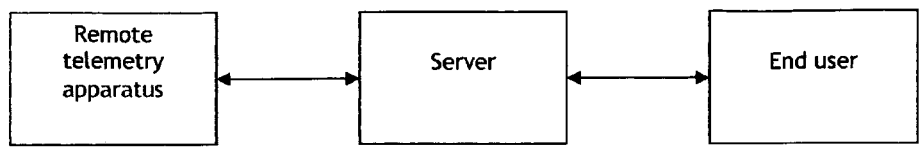
FIG. 7 is a diagram showing one embodiment of the invention incorporating at least one telemetry apparatus, a server and an end user.

FIG. 6 is a diagram depicting the internal electronics according to some embodiments, it comprises:
Core processor (A, B, C)
Modem (D)
Radio (E)
Charger (F)
Door status switch (G).
The status of the door (open/shut) is detected through a small board mounted tilt switch. This switch also controls which bank of LEDs is required to be active.
LED display (H)
Auxillary power connector (I)
System control button (J)
2.4 GHz short range radio (M)
A low-power radio is used to interface to sensors and other external devices wirelessly, removing the need to lay relatively fragile cable over long distances. This feature is enabled by the use of a small, low-power, cut-down version of the telemetry platform at the sensor or 'end-node' location.
Radio expansion connector (N)
This connection allows the future integration of alternative communications devices such as cell based radio, spread spectrum radio or satellite.
GPS receiver (O)
A GPS module with integrated patch antenna allows the system to geo-code itself and any data it records. Geo-coding may also be effected by pre-programming a location into a stationary unit. GPS tracking of mobile installations is also made possible with GPS capability.
Ports (P)
Beeper (Q)
Chip flash memory (R)
On-board flash memory is used as datalog memory under normal operation.
Real time dock (S)
A battery backed up RTC provides a stable and permanent time reference.
Moisture ingress sensor (T)
A contact analogue moisture sensors is used to detect failures of seals in the primary enclosure.
SD flash card slot (U)
Removable flash memory media allows a further option to load configurations and log large amounts of data.
CPU expansion connector (process expansion connector) (V)

Along with the protection of wiring and connectors the secondary enclosure provides a semi-sealed environment for the 12Ahr battery and other ancillary devices as required (FIG. 2). It also features the primary means of mechanical fixing for the product during installation via a flexible bracket system. The door plane of the enclosure serves to set the angle of inclination for the solar panel—the primary enclosure (with integrated solar panel) acts as the door to the secondary enclosure.

The battery is fixed in the enclosure using a cam-over clamp system, it is design such that the battery can be shipped factory-mounted in the enclosure, reducing the risk of damage to the product during transit. The clamp system also allows for easy removal for replacement or during installation.

The use of a secondary enclosure for components that are seen as "user accessible" removes the risk of incidental damage to more sensitive components that the user is not required to access. The secondary enclosure also promotes the execution of recommended installation procedures, for example ensuring no environmentally sensitive wiring is left exposed to the elements.

The use of a secondary enclosure—one that does not house components as sensitive to heat, light and moisture—means that fixtures such as connectors and wiring can be protected from wildlife and the elements whilst still allowing adequate access to maintain ease of installation. The primary entry point for cabling into this enclosure is a single 25 mm conduit gland, encouraging the use of standard electrical conduit in a general installation setting. The enclosure has space for additional entry points/glands to be installed as required. It is intended that wiring will be protected in a suitable conduit until it penetrates the secondary enclosure, where it is then broken out and connected to respective terminals or connectors. The secondary enclosure also acts as the standard mounting point for the primary radio antenna, the antenna cable is thus completely housed within the secondary enclosure.

Standard electrical connectors allow for factory-made wiring looms to be supplied in the case of simple installations. Each connection is duplicated on a screw terminal block to allow an alternate method of connection, typically for more complicated installations. There are two primary connection "ports" these have a specified set of IO connections creating ease of installation and associated planning.

During installation the product is affixed to a solid structure by means of either 4 mounting holes positioned on the back of the secondary enclosure an optional bracket. This bracket is bolted to the secondary enclosure and allows the product to be mounted directly to a pole either driven or concreted into the ground. Both methods of fixing allow the option of hidden fasteners to deter vandalism and theft.

The primary mechanical parts of the product are constructed of welded and powder coated steel. This provides the required UV and corrosion resistance in low production quantities without a large outlay for tooling.

The electronics/solar module features a detachable mechanical bird deterrent (FIG. 1, D). This component is attached via self-retaining thumb screws allowing tool-less attachment and removal (FIG. 4, D).

There are two primary sealing edges in the product:
Door/enclosure seal—this consists of a returned gutter on the male side (secondary enclosure) and a shroud+EPDM gasket on the female side (electronics/solar module). This seal is required to be repeatably cycled by the user and is compressed via two hinge and two opposing side latch mechanisms.
Electronics/solar module PV panel seal—This seal is factory fitted and whilst some requirement for cycle-ability remains it is not intended to be regular or user instigated.

This seal is required to have a high degree of integrity as it protects the relatively sensitive electronic components of the product.

In some embodiments, the unit allows no exposure of materials that are sensitive to environmental factors ie. Heat, UV, wind, water, animals (in particular chewing birds). Such materials (like soft thin plastic and rubber etc.) where used are concealed under metal guttering or shrouds.

In some embodiments, concealable mounting fasteners and key-lockable latch mechanisms (also with concealed fasteners) decrease the risk of vandalism and theft.

In its standard form the antenna attaches directly to the secondary enclosure, which means that a separate mounting system is nut required. The relatively fragile antenna cable is thus also concealed, eliminating the possibility of damage due to animals or environment.

In some embodiments, functionally equivalent sets of colour LEDs provide visual feedback on the operation of the product, for example:

Radio state
Power state
Port A operation
Port B operation

Alternatively the LEDs may provide debugging information should it be required. One of the two sets of LEDs may be positioned on the outside edge of the primary enclosure, allowing them to be seen when the dour is closed. The other set is positioned on the back face of the primary enclosure where the connectors reside, allowing them to seen when the door is open. Only one set of LEDs is active at any point in time, determined by the state of the door (ie. open or shut).

All electronics required by the platform bar the UHF radio are assembled upon a single PCB. The core hardware of the system is comprised of a number of key electronic circuits:

Battery charger—Wide input range, high efficiency—the charging circuitry is optimised for the power needs of the system, including power-point tracking of the integrated 12W solar panel and charge management of the 12Ahr 12V SLA battery. The charger features two automatically controlled modes of operation to maintain efficiency over a range of power inputs—normal mode extracts the maximum amount of power from the panel when under high insulation, low-power mode allows the charger to operate at a higher efficiency during low light times, meaning more power can be extracted from the panel during the fringes of the day. The power input to the battery charger is capable of handling sources ether than the integrated solar panel, for example the power bus of an engine, or more typically a DC wall plugpack (for example, item C in FIG. 5).

Embedded processors (FIGS. 6 A, B, and C)—the central processing hardware is comprised of a low power 8-bit micro-controller, a programmable logic device and a more powerful ARM based processor option (see item V in FIG. 6). The combination of these devices allows for sophisticated code operation and configuration flexibility whilst keeping power consumption to a minimum.

Modem—The combination of an 8-bit micro-controller and a dedicated modem IC provides the required modulation and de-modulation of the signals to and from the UHF radio. This hardware also controls power to the radio allowing it to be turned off during times of power saving. The modem operates at 4800 baud with GMSK encoding.

In some embodiments, the system can support multiple kinds of radio technology and simultaneously if needed. This allows much greater flexibility and a much more robust communication capability. In such embodiments, it is possible for the system to tolerate much greater bat-tiers to communication than would otherwise be possible. Such barriers might for example comprise topography, weather conditions, and so on.

Thus, for example, in some embodiments, the system will first attempt communication using a particular radio technology and then if unsuccessful, try another. In other embodiments, information may be simultaneous sent by multiple technologies in order to maximise the chance that it will be received where it is needed. In some embodiments the system may bridge and route between various technologies, for example across a network of units made in accordance with the invention, in order to effectively communicate. As a non-limiting example, it may be the case that a particular unit is either temporarily (eg. due to weather) or permanently (eg. due to a mountain) out of direct communication with home base. In such a situation in might communicate directly with another unit, for example in a network and for example by shortwave radio. This second unit may then collect, store, and/or retransmit the information via a cell phone network back to home base.

This feature can also be used to minimise expense associated with repeated information transfers across expensive communication networks, such as cell phone networks. Instead, information may be aggregated in to a single unit and passed on from it (thus saving additional charges associated with having all units connected to the network).

There are a number of ways in which to implement this aspect of the invention. In some embodiments, a hardware and software abstraction layer is developed with a meta model which is able to integrate across multiple radio technologies. In some embodiments, the software would be capable of mapping to the various radio technologies, rather than map to a single technology.

In some preferred embodiments, the information may be partially communicated using one radio technology and partially communicated using another.

In some embodiments a 5 watt civil band UHF radio is used as the primary means of communication to and from the platform. The radio configuration (channel selection etc.) can be set via the modem hardware.

The platform of this example embodiment includes electronics for two sets of physical connections to external sensors and devices, known as ports. These ports are made up of a number of different standard device interfaces, each port has two (2) of each of the following, meaning 4 in total for the platform (see for example item B in FIG. 5).

Control/power outputs—Outputs are used to power sensors that do not have their own power source, they can be used standalone as control outputs to switch relays and other passive consuming devices. Each output supplies ~12V at a maximum current of 700 mA. Current limiting is provided in both hardware and software to ensure erroneous wiring does not cause permanent damage to the device connected or the platform.

Contact inputs—Inputs can be connected to any passive switch device, examples of these are certain types of water meters, tipping-bucket rain gauges or any switch the can be connected to ground. The inputs are activated when a connection is made from the terminal to ground, ie. no voltage needs to be applied. The inputs can count frequencies up to 1 kHz @ 50% duty cycle.

Analogue channels—Each control/power output can also serve as a loop-powered 4-20 mA driver. 4-20 mA analogue devices are an industry standard, the output provides power to the device, the device in turn draws an amount of current proportional to the variable it is sensing. The reading is then derived from the output of the current sensing circuitry of the output.

Serial RS485 channels—RS485 is an industry standard serial communications hardware protocol, it is extremely robust and well suited to an application of this sort.

Serial RS232 channels—RS232 is another serial communications hardware protocol typically used in computer systems. These connections are used for PC communication, debugging, and any other serial devices that do not have an RS485 option.

The internal hardware also features a number of integrated devices greatly expanding the capabilities of the platform:

User input buttons (eg. FIG. 5, item A and FIG. 4, item C)—The platform has two user accessible push buttons providing reset and power down functionality as will as acting as inputs to application level functionality such as recording a 'visit' event.

Power is a critical point in any remote telemetry system, particularly those in extremely remote areas. Increases in power consumption have flow-on effects that ultimately increase the cost and complexity of the product or installation. A large focus has thus been to reduce power consumption to a bare minimum, this means taking measures such as turning sensors on only when needed, carefully managing radio activity and designing hardware that has minimal quiescent current draw.

4. Telemetry System.

The invention contemplates at least one telemetry apparatus communicating information (including telemetry and diagnostic information) to a second location. At that second location a user may view and manipulate the information in any suitable way.

In some further embodiments multiple telemetry apparatus may be deployed which then work together in a network (or via a number of different networks) to communicate information to other elements of the telemetry system.

a. In Infield Installation, Characteristic Announcement and Network Discovery

As described above, when a single telemetry apparatus is deployed to a location, that unit communicates information back to a base station using any combination of communication methods contained within its communications module. As described above, the selection of communications may change and may be driven by a System Plan.

Single point-to-point communications has a number of disadvantages. In the most simplistic form, communications cannot be established with an apparatus which is located within a communications "black-spot". For example, a mountain between the base station and the apparatus may prevent all communications between the two.

The present invention contemplates a telemetry system comprising:
  a number of telemetry apparatus; and
  a home base (server).

Each telemetry apparatus contains a number of different network protocols, supporting a number of different network topologies through a number of different hardware network interfaces (as noted above, which may be radio based or any other type of suitable communications network). When deployed, each telemetry apparatus searches each of its network interfaces for an available network topology. Once an available network topology is located, the telemetry apparatus attempts to communicate via that network using one of its known network protocols to any other apparatus or home base. Optionally, attempted communication can be to any other trusted apparatus using any suitable method of authentication.

For the purposes of security, each level in the network stack may apply any appropriate method of encryption, authentication and/or non-repudiation.

A number of network topologies permit the sending of information via a broadcast to each other unit in the network. Where such communication is available upon joining the network, each apparatus may optionally broadcast to each other apparatus:
  The fact of its existence
  Characteristics about its location in the network (for example, nodes which it has established communications with)
  Its operational capabilities
  Its Service Plan
  And any other information that may be relevant to other apparatus in the network.

Using the above example of a base station of one side of a mountain and a telemetry apparatus on the other, a second telemetry apparatus installed on top of the mountain may have direct communication with both the base station and the first telemetry apparatus. Upon installation:
  the second apparatus would broadcast a message letting the network know that it has been switched on and it wishes to join the network
  the base station would reply to the broadcast by confirming that the second apparatus has successfully joined the network and sending a list of apparatus which the base station has contact with (which in this case, is none)
  the first telemetry apparatus would reply to the broadcast by confirming that the second apparatus has successfully joined the network and sending a list of apparatus which the base station has contact with (which in this case, is also none)
  the second apparatus would notify the first apparatus that it has communication access to the base station
  the second apparatus would also notify the base station that it has communication access to the first apparatus Information from the first apparatus (located behind the mountain) can then be forwarded by the second apparatus (located on top of the mountain) to the base station and vice versa.

Interchange of known apparatus and communications pathways is maintained via the different telemetry apparatus. In this way, remote monitoring an be achieved in locations where base station to in field unit is not normally achievable.

Further, flexible and dynamic network topology can be used to improve performance characteristics. For example, a number of apparatus installed at different locations which each have communications to a base station might each take turns in communicating aggregated data to the base station. Low powered communication between the apparatus can be used to aggregate the information before a single apparatus uses a more high powered method of communicating the information back to the base station. As a further, if the high powered communications method was provided by a third party and therefore more expensive, costs may be reduced by both limiting the use of that network to one apparatus at a time or reducing the number of apparatus that have the ability to communicate using that method back to home base.

Negotiation of co-operative communication plans can be established by defining overall system capabilities (for example, though a System Plan) and exchanging those capabilities though out the network.

a. Network Topology Negotiation

In some embodiments, apparatus may alter the form of communication depending on one or more parameters. Thus, for example, if the only available radio connection is of low bandwidth, then an alternative, more suitable communication method may be selected. Likewise if a high bandwidth connection is available, but the unit is conserving power, an alternative route may be selected. For example, the system may elect to send the information in smaller subparts so as to use up less bandwidth. In some embodiments this may for example be achieved by using circular buffers, and a monotonically increasing addressing scheme and a protocol for accessing the subparts of information which can be tuned to the receiver's fault tolerance.

In addition, different network topologies and communications protocol have different benefits in terms of reliability, throughput, latency and other characteristics. In the same way that different network speed may be negotiated and used to achieve the most appropriate characteristics, so to can the type of network.

In some embodiments, the system breaks information to be transmitted into subparts to be separately transmitted. These subparts may be communicated concurrently and multiple copies of a subpart may be transmitted to a plurality of places concurrently. Further, each subpart may be communicated to its ultimate destination via a different path and by different units in the network. Such a communication method provides much greater tolerance to pour communication environments and intermittent access and allows each unit to flexibly control power consumption by selectively controlling the timing and duration of its communications. In contrast, current methods download data in a continuous stream which may be broken due to a communication failure and would therefore have to be repeated. In some embodiments each subpart is indexed so as to be able to be reordered after arrival at the destination. The receiver's communications module may be configured so as to track the subparts which have been obtained and/or those yet to be received so as to readily pick up the information transfer when a connection is re-established.

b. High Level Network Protocols Used in the System

In some embodiments and as a significant improvement over conventional bespoke systems, the close integration of various elements of the system enables the use of open standards for data communication and storage. As a preferred embodiment, the system may make data available in any appropriate machine readable format (such as XML). Data may be transmitted using a "pull" methodology (as one non-limiting example, via a HTTP GET request to the specific device) or a "push" methodology (such as a POST request to a centralised web service). In further embodiments, higher level interactions with devices are contemplated using interoperability and data exchange standards such as SOAP. Syndication of telemetry data via an RSS feed is also contemplated in further embodiments. In one further embodiment, each unit may make data available in pre-formatted HTML. By employing such a method, this system overcomes many issues in using and integrating conventional and bespoke systems into existing networks, in particular by providing levels of abstraction between the raw data and common formatting standards for data directly at the apparatus level. Such pre-processing of raw data is further enhanced by the tight integration of the data module (including sophisticated computational capabilities) and the effective use of the energy and communications module allowing the use of higher powered computational devices without reducing communications capability or increasing energy requirements beyond what is available.

In one embodiment, information transmitted by the system is encrypted using any appropriate algorithm to balance the processing and power requirements of the applicable unit and the security required by the method of communication. For example, communication using a line of sight point-to-point communication method in a very remote area may by election use less secure communications channel (and thereby require less encryption processing on the unit and thereby consume less power to communicate) than the same information if communicated over a public network such as the Internet.

In one embodiment each unit can use the network to send instructions to other devices on the network. Such messages can be invoked manually or by business rules, stored centrally or within the particular unit. In one preferred embodiment a rainfall monitoring unit detects rain falling at its location, interrogates the business rules and, upon direction of the business rules, send a control message across the network (which may pass through one or more other units using one or more communication methodologies) to a second unit which turns off irrigation at a second location. Where the business rules are stored centrally, such business rules may be used to control more than one different unit.

5. Telemetry Server Functionality and Aggregation and Synchronisation of Data

The telemetry server acts as an aggregation point for information communicated by each telemetry apparatus. End users of the system access information from the apparatus by either querying the apparatus directly or querying the server. The server may be a remotely located device (or number of devices) or may be a logical server located on the same computing device as is used to view the information from the server.

While the primary function of the server is to aggregate information from telemetry apparatus, it also performs a number of different functions, including:

Management of the efficient storage of information, including by moving information to most efficient and cost effective storage locations and compressing stored information using any suitable means Storage and propagation of System Plans created by the end user after installation of a telemetry apparatus Storage and propagation of business rules Computation functions in relation to the aggregated data Security functions in relation to the aggregated data Similar to each telemetry apparatus, the server characteristics are defined by the System Plan.

The server can deliver previously stored information using any suitable format, including for example, HTML or XML.

Data obtained from a plurality of units can be aggregated and used to great benefit. Thus for instance, a network of units according to the present invention allows much finer detailed information about local weather and water conditions. Thus for example in some embodiments in which a plurality of units measure water levels in springs or wells, much greater information can be obtained about the level of the underlying water table and the water reserves in the region.

In order to facilitate the aggregation of data and to ensure data integrity across the system, various settings, configuration data and system status messages can be synchronised between each unit. Such data can either be synchronised as dedicated network messages or by passing information in unused data spaces within existing communications.

Other data synchronised between units is important for the most efficient operation of the system, such as time clocks. As one preferred embodiment, using synchronised time clocks between units, power of each unit is conserved by only communicating during certain time periods when each unit knows radio communications will be available.

Further, data can be geo-coded with a suitable location designation, such as longitude and latitude provided by the GPS system. Geo-coding of data on a portable unit allows data collection and analysis by activity (which may be stationary or may occur at different locations and times), an asset (which may be a stationary asset or may move) or an animal. Geo-location further assists in the location of each unit, particularly if the unit is lost or relocated without appropriate records being kept.

In some embodiments, from a software perspective, the architecture is designed to readily accommodate the various impediments to the communication and aggregation of data, including using open and/or commonly used standards for data communication and storage. Thus, data may for example be communicated in such a way as to be readily presentable on a web interface which therefore makes it much easier to pass through communications infrastructure. It may also be communicated in other ways which avoid firewalls.

Long-term operation of the monitoring system will result in large amounts of data being collected. In one preferred embodiment, the collected data is transmitted to a server, where the data is stored in an efficient way for later retrieval. The cost of transmitting and storing this data will impact operating cost and therefore be a relevant consideration in achieving the performance goals described in the System Plan. One element of the System Plan will be the ability to described desired data retention policies, including level of data detail and data frequency. Such retention policies may be automatically configured based on other elements of the System Plan in order to achieve other operational goals, for example by only retaining data that is known to be needed, only retaining data at an appropriate level of detail, archiving and/or deleting data once it falls outside specific operational ranges (including historical data and detail levels) and adjusting backup policy to confirm with the specified System Plan.

This information will enable the use of highly efficient caching and other memory based storage & retrieval strategies. Additionally, it will also facilitate automatic use of MapReduce and other highly optimised algorithms designed for real-time data access. Resources required to service user requests must also be controlled. System Plan attributes will enable the optimized pre-rendering of graphical representations of data that meet requirements, and offer far more efficient use of computational resources.

Similar to data, computing resources used by the system can be configured and altered on the basis of the System Plan. Further, use of computing resources has an impact on operational cost.

As computation resources become increasingly fungible, the system will use the System Plan attributes to automatically and dynamically select computational resources that conform to the System Plan and achieve the desired operational outcomes.

6 Determination of Components and Performance Characteristics Based on the System Plan and Other Desirable Characteristics The current invention describes a method for selecting components based on certain characteristics to create the telemetry system and apparatus. The characteristics desirable for the system and/or apparatus are recorded in a System Plan.

Selection of physical components to comprise the energy module, communications module and data module is based on the desired characteristics in the System Plan as compared to the characteristics of each hardware component.

Further, where conflict with desirable pricing characteristics permits, additional levels of flexibility in future System Plans may be obtained by appropriate selection of hardware components. For example, a telemetry apparatus with only one method of communication may have a more limited communication range than a telemetry apparatus with two methods of communication. Therefore the System Plan for the second apparatus would allow more flexible descriptions. In this way, the most relevant System Plan criteria influences the selection of hardware components which, once selected, may alter the System Plan scope for all characteristics or change the System Plan for less relevant characteristics.

An important aspect of some embodiments of the invention is monitoring and adjusting (in real-time or near real-time) the balance between performance, energy use and cost of running the system. This is achieved in various embodiments by methods including:

1. Closely managing and minimising energy consumption;
2. Closely integrating the system components in order to obtain maximum performance for the energy budget. This for example enables the use of smaller batteries and smaller solar panels.
3. Monitoring and notifying the user about the quality and reliability of information so that the user can make informed choices about optimising the operation of the system.
4. Providing the system in a physical platform which is designed for a rugged environment.
5. Minimising the cost of operation, for example by minimising the need for travel to the location of hardware.
6. Utilizing a multi channel communication architecture to optimise communication effectiveness and efficiency.
7. Utilizing different network topologies and communication methods to minimise the power consumption of particular units.
8. Ensuring that quality and reliability of the information are readily apparent throughout the visualisation environment and user interface.
9. Capturing, monitoring and acting on information about the status of the system itself. This includes self-diagnostics and display of relevant results to allow the user to factor this information into decision making.
10. Indicating quality and reliability, for example by:
    a. Indicating how old the information is. (So that the user knows at what point in time the last accurate information was gathered.)
    b. Indicating whether there are any errors in the equipment involved in the monitoring (for example with icons and/or colours). Thus, an intermittent failure in a sensor would show up as intermittent readings and perhaps with a warning message. For example, the most recent reading may have been within the past 5 minutes, but there has been a history of missed readings or equipment failure within the last ½ hour.
    c. Using the software to set tolerance levels for reliability. Thus, by way of example, any information more than 2 hours old may be automatically deemed unreliable.

In some aspects, the system of the invention collects and monitors information in much finer detail than previously has been the case, which enables a range of benefits. One benefit of this approach is that the reliability of the data can much more readily be ascertained. Testing data reliability is crucial in telemetry applications to save the time and expense of unnecessary travel on site, for example for maintenance or to check recordings, etc.

Using a water level sensor as an example, the system is capable of measuring not only whether the water level at a particular point is high or low the traditional method), but instead it may for example provide measurements in depths, for example graduated at 0.05 m steps. In addition, measurements may be taken more frequently or in real time. A more detailed data collection method will show more minor variations in water levels over time so that if the data were graphed, it would appear to jump up and down, rather than depict a straight line. If the water level sensor were damaged, it might for example show the water level to be 'low'. It will be much easier to identify this as a fault using the present invention, because the fault will not include the normal variations in depth (up and down), but rather indicate a straight line. Whereas, with current systems, the operator would be left to wonder whether some other event has occurred, which has suddenly dropped the water level, as there will be no up and down variation to signal that it is a fault.

In addition to monitoring and reporting numerical values, the data interface can also accommodate more complex monitoring devices, such as image processors. Conventional image capture and processing devices have focused on either "webcam" applications (being lower quality devices focused on lower bandwidth communications and not sufficiently robust to deploy outdoors) or "security" cameras (being higher quality devices which are more robust, but expensive and requiring higher power to operate). According to one preferred embodiment, the system includes a low power, high quality; robust and environmentally shielded image acquisition device attached to the data module. Such device can capture, store, process (such as image enhancement or incorporating geographical, environmental and system data into the image file) and/or transmit images on a periodic basis. Such periodic basis may be event based, such as being triggered by a timer or trigger events from other devices (for example, the water level reaching a certain point). When transmitted, images can be sent via the network, including over UHF radio. In another preferred embodiment, in addition to images, video can be transmitted in real-time or near real-time.

In some embodiments other aspects of the operation of the system can be tuned to particular needs. Thus for example, power consumption may be reduced to a set minimum in periods of low ambient light if the power source is one which is recharged via in energy source such as wind turbine, water, or solar panel. Additionally, for units located in geographical locations known for particular environmental characteristics (such as a significant number of days cloud cover), appropriate sources of power can be selected for the unit (such as a wind turbine instead of or in addition to a solar panel).

Certain embodiments of the system of the invention is designed to minimise the need for human intervention at the site of installation. By doing this, costs associated with travel, components and maintenance are dramatically reduced.

Similarly dramatic savings are made by optimising energy use. Thus the system of the invention requires much less energy to operate than conventional units.

In some embodiments, the required communications capacity is minimised in order to reduce overall long term cost of operation. This is achieved through lower communications costs (eg. paid to communications network providers) and lower energy costs, etc.

Various features may be added to such embodiments. Thus for example, in some embodiments, the system may inform the user of the price that will be paid in lower performance it they choose a lower priced or lower bandwidth radio technology. VMS, for example, the system would notify the user that the data may be unreliable if UHF is selected but there has been no communication for some time via that means. Such an error warning is far preferable than merely displaying the must recent reading, which may be incorrect at the time it is displayed. This feature is particularly important in maintaining the high quality of data and low overall long term cost of use.

7. Methods for Reducing Maintenance of Apparatus

In some embodiments, the system continuously monitors information about the operation of the system itself. This information may be made-accessible via the usual telemetry and remote connections, or by any suitable method.

Traditional telemetry systems do nut monitor the system itself, but instead rely on whether information has been received from one or more sensors. A complete lack of information has to be interpreted as best the user can. Furthermore, traditional telemetry units are put together from a range of unrelated parts in a bespoke way. This presents large difficulties in supplying an indication of the overall health of the system, as the normal requirements, tolerances and health of individual components and the way they interact with each other is quite difficult to assess.

By monitoring the operation of the system itself, the quality of information received from the external sensors can be more accurately assessed and the maintenance costs can be dramatically reduced as there is less need to travel to each unit to check it. Furthermore, any faults are speedily and accurately identified so that appropriate maintenance resources can be directed in a timely manner. In some embodiments, real-time or near-real time reporting is made possible which dramatically improves overall usefulness of the system and reduces maintenance costs.

Standards for interoperability of the various components can be developed due to their close integration which means that they are more readily accurately monitored, particularly as a whole.

Any suitable diagnostics may be used to monitor the health of the system. Thus, in some embodiments, there are detectors for water ingress into the primary and or secondary enclosures. Similarly, detectors may sense temperature or humidity.

Wiring or other components, for example which travel outside the unit may also be monitored, for example by monitoring a very small current which passes along the wire. If the current is interrupted, then it will be apparent that the wire has been disrupted and appropriate warnings can be displayed and acted upon.

In some embodiments, an end of line resistor network may be used to detect wiring faults and miss-wired connections. This may be achieved for example by sensing short and open circuits in the line via an analogue sampling channel. Thus the state of the sensor device is monitored as well as the state of the cable connected to it. This diagnostic feature allows the user a greater sense of confidence that the end device is operating correctly.

This is preferable to the current situation in which an unusual reading or a complete lack of a reading at all can only be diagnosed by physically attending to the unit.

In some embodiments all communications from and to a unit are monitored and recorded so as to collect useful information about successful and unsuccessful attempts at communication and optionally analyse them.

In some embodiments, the battery charge level, history and current condition are monitored. In some embodiments the amount of solar radiation and or the health of the solar panel are monitored. Equally, alternative sources of energy may be used, such as wind, and in these units appropriate diagnostics can be used to monitor the health of the system.

In some embodiments, the physical design of a unit according to the invention is designed for simple in-field replacement. Thus for example in some embodiments, certain components are readily disengaged and swapped for replacement parts. Thus, in some embodiments, the entire primary enclosure can be readily replaced (or 'hot swapped'). This saves time in the field and allows more accurate and higher quality maintenance of components within the primary enclosure back at the maintenance facilities. Similarly, other components of a unit may be swappable, such as the secondary enclosure, the solar panel, the antenna, and so on.

In preferred embodiments of the system according to the invention, the same approach to gathering and monitoring data in fine detail is used across all monitored parameters, whether they are in respect of monitoring the components and function of the system and platform itself, or whether they are sensors of the external environment, such as a water level sensor.

A number of key improvements are also possible when a plurality of units according to the invention are combined operationally. For example, a plurality of units may be networked together for improved ease of communication. In such embodiments, information may be passed from one unit to another in order to find a suitable unit from which to communicate back to home base. Different network topologies and routing algorithms can be employed by the nodes in the system to assist in the propagation of messages on the network, based on such factors as power requirements of a particular node, quality and bandwidth of communications between a particular node and the remainder of the network and the reliability of the particular communications channel. Such network topologies and routing algorithms can be altered dynamically as variables in the system change. In one preferred embodiment, each unit can act as a bridge to a higher capacity network, in one example a 3G wireless network provided by a third party telecommunications provider.

8. Use of Open Interfaces to Enhance Flexibility of Apparatus Modules

According to some preferred embodiments, there is provided an all-in-one out-of-the-box solution for a remotely situated radio telemetry system. It is a self-contained, self-powered platform that is easily installed, maintained and upgraded. In addition, the platform supports a wide range of largely plug-and-play sensors and devices that allow an even wider range of data types to be measured, recorded and observed. It also provide telemetry data in common data formats also used by third party software.

In some aspects of the invention, the platform provides a close integration of components that are typically "cobbled together" in prior art systems. Through such integration, a tight reign is able to be held on factors critical to the operation and liability of such a system.

Areas of improvement over current, known systems may for example include:
1. Site access—The point of a remote monitoring system is to reduce or eliminate the need to be physically present at a measurement site. Components requiring regular maintenance or checks are hence nut ideal for use in such a system.
2. Power consumption—In a remote self-powered system power is equivalent to cost—cost of equipment, installation, shipping and maintenance. Components from the industrial sector used in bespoke systems are rarely considered to be low-power.
3. Reliability—Reliability relates in part to site-access, but further to this a simplified system that can be manufactured in conjunction with a QA scheme will generally result in more reliable operation, resulting in greater value to the end user.
4. Installability—Complex installs in remote locations require a great deal of logistical effort, if the system can be simplified and a large proportion of the work done "in-factory" then installations become simpler and cheaper.
5. Maintainability—Bespoke systems with individual components require large amounts of in-field wiring, housings and mountings, adding to maintenance costs.
6. Upgradeability—If hardware has sufficient 'headroom' and some degree of forethought is present in the design of the system then 'remote' upgrades are viable. This provides greater ease of expansion and flexibility in the system.
7. Shippablilty—Shipping of equipment to remote areas where installs generally take place is costly, anything that can be done to reduce the size and mass of the system will obviously reduce this cost. Additionally a product that is able to be produced in quantity allows for a more efficient packing and shipping procedure.
8. Cost—Bespoke systems not only require the use of relatively expensive control and measurement products, but also require a large degree of per-site engineering and customisation. A product that can be produced in quantity yet is flexible enough to be easily adapted to the end user requirements will be more economical.
9. Open standards—Bespoke systems often employ proprietary data communication and storage systems, thereby making it difficult to integrate to other existing systems.

What is claimed is:

1. A telemetry apparatus for receiving information at a location and communicating at least a subset of said information to a second location, the telemetry apparatus comprising:
   a memory store;
   a plurality of modules executing on one or more computer processors and including an energy module, a communications module, and a data module;
   wherein at least one of the plurality of modules is configured to:
      receive into the memory store, operational parameters from one or more sources, the operational parameters comprising at least one of: cost; a communication parameter; energy use; operational requirements; and environmental conditions;
      generate by a processor, a machine readable system plan at least partially from the received information from the one or more sources, wherein the system plan includes, for each operational parameter, a scope of value, and one or more priority weightings, the one or more priority weightings based at least on a source of the operational parameters from among the one or more sources;
      self-adjust one or more aspects of the telemetry apparatus based on the one or more priority weightings of the operational parameters of the system plan; and
      provide a visual indication of at least one operational parameter.

2. An apparatus according to claim 1 configured to work in conjunction with at least one other such apparatus.

3. A method for constructing a telemetry apparatus, the method comprising:
   receiving into the memory store, operational parameters from one or more sources, the operational parameters comprising at least one of: cost; a communication parameter; energy use; operational requirements; and environmental conditions;

generating by a processor, a machine readable system plan at least partially from the received information of the one or more sources, wherein the system plan includes, for the operational parameter, a scope of value, and one or more priority weightings, the one or more priority weightings based at least on a source of the operational parameters;

autonomously adjusting one or more aspects of a telemetry system based on the one or more priority weightings of the operational parameters of the system plan; and providing a visual indication of at least one operational parameter.

4. A non-transitory machine readable medium comprising instructions which, when read by the machine, cause the machine to perform operations comprising:

receiving into the memory store, operational parameters from one or more sources, the operational parameters comprising at least one of: cost; a communication parameter; energy use; operational requirements; and environmental conditions;

generating by a processor, a machine readable system plan at least partially from the received information from the one or more sources, wherein the system plan includes, for the operational parameter, a scope of value, and one or more priority weightings, the one or more priority weightings based at least on a source of the received information from among the one or more sources;

self-adjusting one or more aspects of a telemetry system based on the one or more priority weighting of the operational parameters of the system plan; and providing a visual indication of at least one operational parameter.

* * * * *